(No Model.)
P. BAKER.
FOUR HORSE EQUALIZER.
No. 416,822. Patented Dec. 10, 1889.
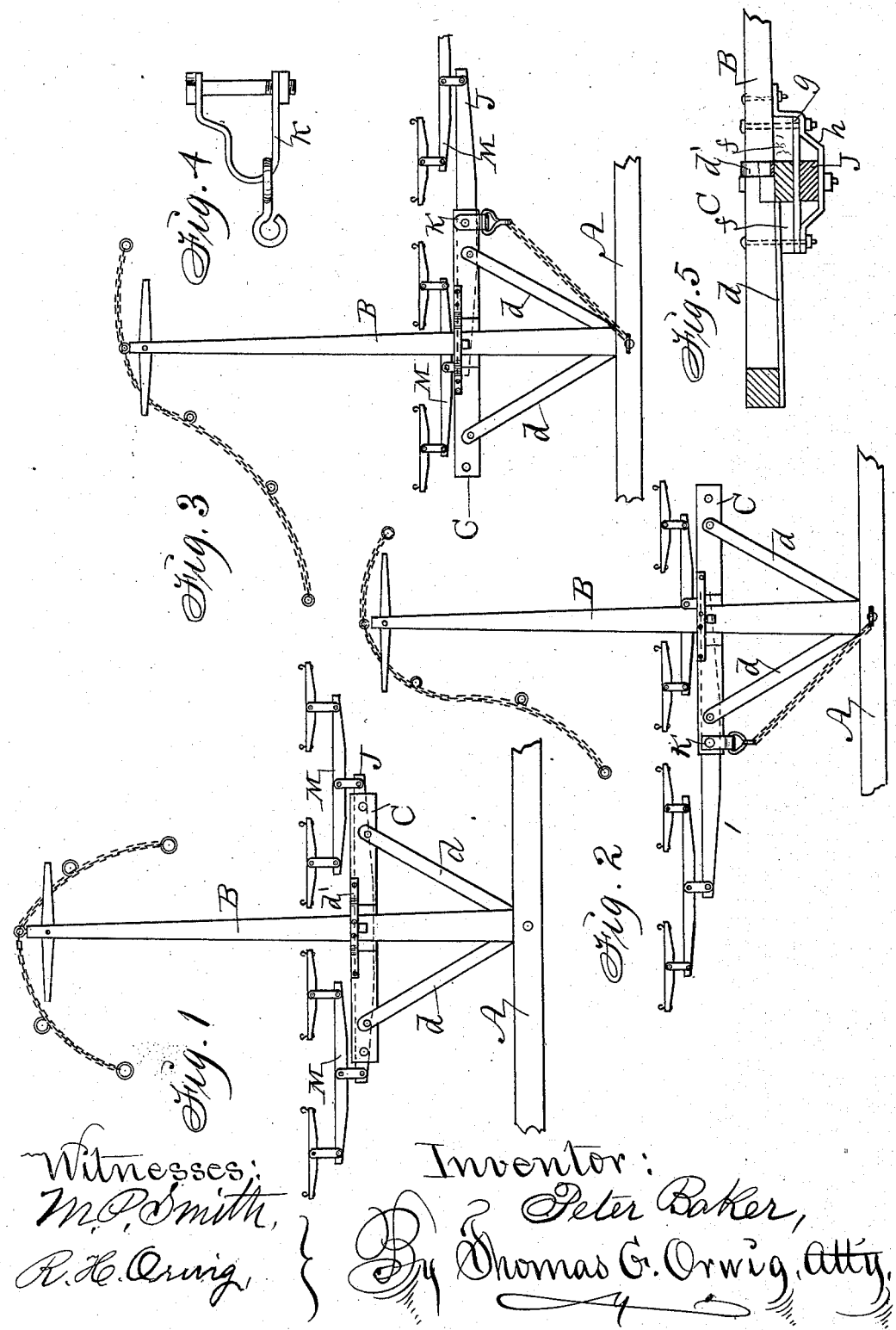

UNITED STATES PATENT OFFICE.

PETER BAKER, OF KEOTA, IOWA.

FOUR-HORSE EQUALIZER.

SPECIFICATION forming part of Letters Patent No. 416,822, dated December 10, 1889.

Application filed October 7, 1889. Serial No. 326,203. (No model.)

*To all whom it may concern:*

Be it known that I, PETER BAKER, a citizen of the United States of America, and a resident of Keota, in the county of Keokuk, State of Iowa, have invented an Improved Four-Horse Evener, of which the following is a specification.

My object is to construct a four-horse evener and combine it with a binder and harvester, a road-grading machine, &c., in such a manner that it can be readily adjusted so that three horses can be hitched on the right side and one on the left side of a pole, or three on the left side and one on the right side, or two horses on each side of the pole, to produce a center draft relative to the machine with which the pole and evener are constructed.

My invention consists in the construction and combination of an evener-support with a pole, and detachably and adjustably connecting therewith an evener, doubletrees, singletrees, a clevis, and chain, as hereinafter set forth, pointed out in the claims, and illustrated in the accompanying drawings, in which—

Figure 1 is a top view showing the evener connected with a pole as required to place two horses on each side of the pole. Fig. 2 shows the evener in position as required to hitch three horses on the left side of the pole and one on the right side. Fig. 3 shows the evener adjusted for three horses on the right side and one on the left. Fig. 4 shows a clevis adapted in form for connecting the evener with the fixed support and a chain. Fig. 5 is a cross-section view of the evener-support and the evener combined with the pole.

A represents the frame of a harvester and binder, to which a pole B is rigidly fixed in any suitable way.

C is an evener-support in the form of a straight bar that is rigidly fixed at its center to the bottom side and rear portion of the pole, so that each end of the support will extend at right angles from the pole in a horizontal position.

*d d* are metal braces fixed to the ends and top side of the support C, and to the under side of the rear end of the pole by means of screw-bolts, or in any suitable way.

*d'* is a brace fixed across the top of the pole at its center and to the support C at its ends.

*f* are blocks fixed to the under side of the pole and against the opposite sides of the support C, as shown in Fig. 5.

*g* is a metal plate fixed across the support C and to the under sides of the blocks *f*.

*h* is a loop fixed to the under side of the pole and the plate *g*, to serve as a bearing for an evener J when it is pivoted to the pole, as shown in Fig. 1, and as a loop to restrict the motion of the evener when it is pivoted to one of the ends of the support C, as shown in Figs. 2 and 3, and the inner end of the evener extended through the loop.

K is a clevis pivoted to the end of the support C and the center of the evener J, and connected with the rear end of the pole, or the front and center of the frame to which the pole is attached, to aid in directing the draft of the three horses to the center of the machine.

M are doubletrees connected with the ends of the evener in a common way, and singletrees are connected with the ends of the doubletrees.

The horses are connected with the front end of the pole by means of a yoke and chain.

I claim as my invention—

1. A transformable four-horse evener, comprising an evener-support fixed to the rear portion of a pole to project horizontally at right angles and even distances from the pole, an evener, a loop and bearing fixed to the under side of the pole and parallel with the pole and across the fixed evener-support, a clevis and chain detachably connected with the ends of the evener-support, an evener, two doubletrees, and four singletrees, arranged and combined substantially as shown and described, for the purpose stated.

2. The evener-support C, fixed to the pole, to extend equal distances on each side of the pole, the plate $g$ and the loop and bearing $h$, extending parallel with the pole, an adjustable evener J and a clevis and chain arranged and combined to support two doubletrees and four singletrees in different positions relative to the pole, and a machine to which the pole is attached, substantially as shown and described.

PETER BAKER.

Witnesses:
  JOHN STREIT,
  MIKE W. BAKER.